April 21, 1953  G. R. KRUZELL  2,635,341
TELESCOPE MOUNTING FOR GUNS
Filed Oct. 29, 1949  2 SHEETS—SHEET 2

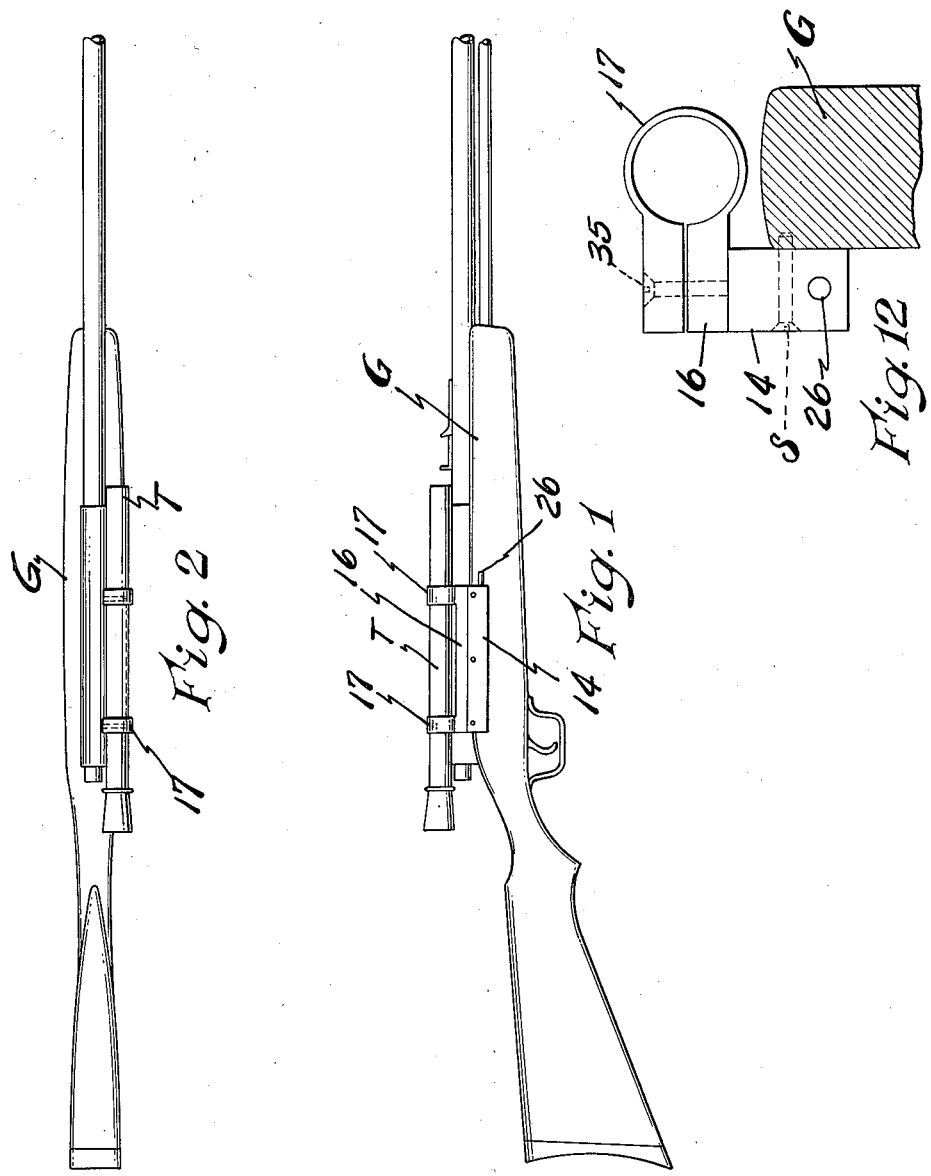

INVENTOR.
George R. Kruzell.
BY
Frank C. Fearman
ATTORNEY

Patented Apr. 21, 1953

2,635,341

UNITED STATES PATENT OFFICE 2,635,341

TELESCOPE MOUNTING FOR GUNS

George R. Kruzell, Bay City, Mich., assignor to Samuel Johnston, Harbor Springs, Mich.

Application October 29, 1949, Serial No. 124,401

3 Claims. (Cl. 33—50)

This invention relates to a means for mounting a telescopic gun sight upon a gun, and more particularly to a mounting which can be quickly and easily applied to the gun, and provide means whereby the scope carrier can be easily, quickly and accurately removed and/or replaced with a minimum of effort, and without the use of tools of any kind.

One of the prime objects of the invention is to design a very simple, substantial mounting which insures that the telescope, when removed and replaced, will return to its original position without the necessity of any adjustments or danger of loss of previous accurate adjustment.

Another object is to design a highly efficient mount for telescopic gun sights to facilitate attachment of the mount on the gun, and provide for easy and extremely rapid removal and/or replacement of the detachable scope carrier and the telescope contained therein.

A further object is to provide a mounting comprising a base and scope carrier which can be readily manufactured and assembled, and in which the carrier automatically clicks to locked position when it is pressed down to position on the base.

A further object still is to provide a mounting in which the scope carrier is unlocked by means of an easily operable finger-controlled locking plunger.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side- elevational view of a gun showing my mounting in place thereon, with a telescope mounted in the scope carrier.

Fig. 2 is a top, plan view thereof.

Fig. 12 is an end-elevational view showing the scope carrier offset to bring it over the gun barrel.

Figure 11:
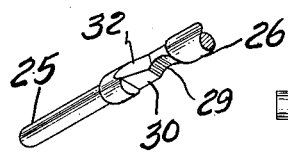
Fig. 11 is a fragmentary, perspective view of the locking plunger.

Referring now more particularly to the drawings in which I have shown the preferred embodiment of my invention, the letter G indicates a gun of conventional design, and on which my improved scope mounting is secured, this mounting including an elongated base member 14 formed with transversely disposed, spaced-apart openings 15 adapted to accommodate screws S for securing the base in position on the side of the gun, and a scope carrier 16 is detachably mounted on said base, said carrier being formed with split scope rings 17 provided on the opposite ends thereof, and screws 18 are provided for tightening the rings to firmly secure the telescope T in position on said carrier.

Spaced-apart, tapered pins 19 are mounted on the carrier 16 and are held in position by means of key pins 20, said pins 19 projecting downwardly as shown and in register with tapered openings 21 provided in the base 14, and a slotted passage 22 is provided intermediate the length of each pin, the lower face of said passage being angled as shown, and for a purpose to be presently described.

A longitudinally disposed bore 23 is provided in the base 14, one end being reduced as at 24 to slidably accommodate the reduced end section 25 of a locking plunger 26 which is slidably mounted therein, a spring 27 being mounted on the reduced section 25 and is interposed between the shoulder 28 and the reduced opening 24 in the base.

The vertical centerline of the tapered openings 21 are offset with relation to the horizontal centerline of the locking plunger 26, said plunger being formed with cutout sections 29 which are shaped to slidably accommodate the portions of the pins 19 which project into the bore 23.

A flat surface 30 is formed on the plunger 26 directly adjacent the cut-outs 29 and the upper and lower edges of the plunger are cut away and angled as at 31 and 32 so that they closely fit the cut-out sections 29 of the pins 19 when the plunger is in locked position, the spring 27 serving to exert outward pressure on the plunger at all times.

A way 33 is formed in the one side of the plunger 26, and a guide screw 34 extends thereinto to prevent rotation of the plunger in the bore.

Figure 4:
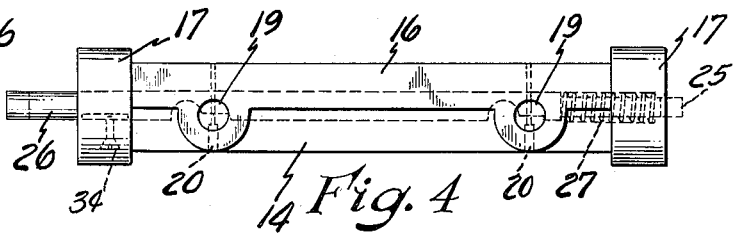
Fig. 4 is a top, plan view thereof.
Figure 5:
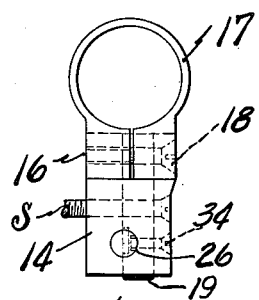
Fig. 5 is an end-elevational view.
Figure 3:
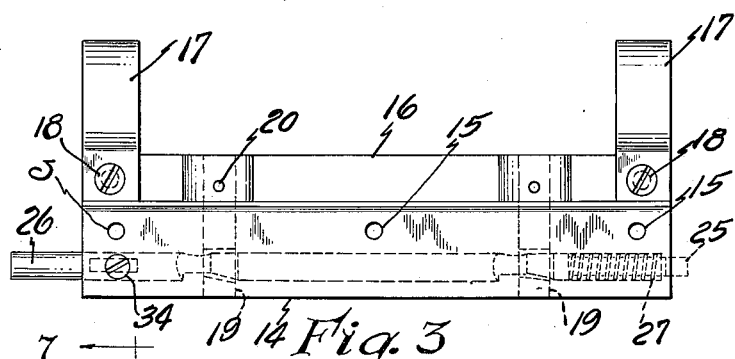
Fig. 3 is an enlarged, detail, side-elevational view of the mount showing it in locked position.
Figure 7:
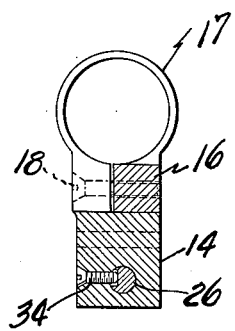
Fig. 7 is a sectional, end-elevational view taken on the line 7—7 of Fig. 6.
Figure 6:
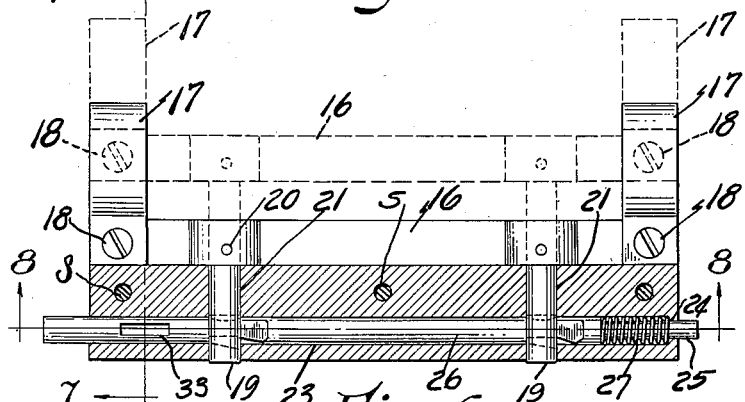
Fig. 6 is a part-sectional view similar to Fig. 3, with the mechanism in unlocked position, the broken lines showing the scope carrier raised for removal.
Figure 10:
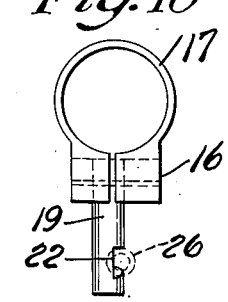
Fig. 10 is an end-elevational view of the mechanism shown in Fig. 9.
Figures 8, 9:
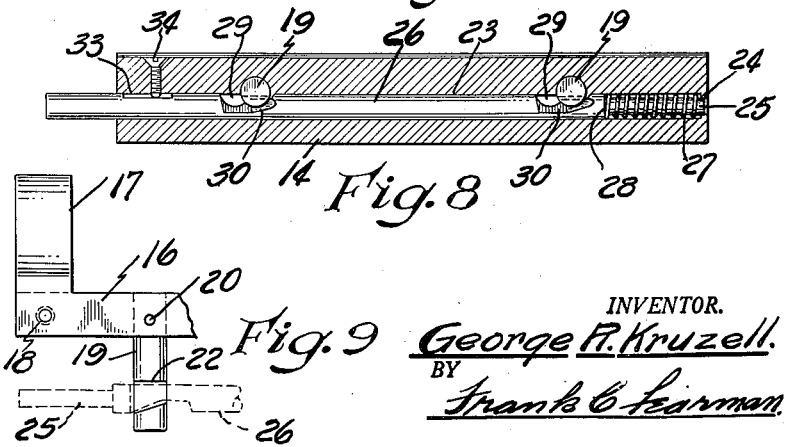
Fig. 8 is an inverted, sectional, plan view taken on the line 8—8 of Fig. 6 and looking in the direction of the arrows, the mechanism being shown in locked position.
Fig. 9 is a fragmentary, side-elevational view showing the scope carrier, the broken lines showing the locking plunger in locked engagement with the carrier pins.

With the plunger in position as shown in Figs. 3, 4 and 6 of the drawings, the pins 19 are in interlocking engagement with the plunger 26, holding the scope carrier firmly in position on the base, and when for any reason it is desired to remove the scope carrier, the operator merely places a finger on the free end of the plunger, forcing it inwardly to position indicated in solid lines in Fig. 6 of the drawings to bring the cut-out sections 29 into register with the pins 19, and the scope carrier can then be easily removed and as clearly indicated in broken lines in Fig. 6.

To replace the scope carrier, it is merely necessary to bring the pins 19 into register with the openings 21, pressing inwardly on the plunger, and when the scope carrier is bottomed on the base, the plunger is released and the spring 27 will force the plunger to locked position.

In Fig. 12 of the drawings, I have shown a slightly modified construction in which the scope carrier is offset with relation to the base 14 so that the telescope will be disposed directly over the gun barrel, and screws 35 serve to secure the clamps tightly in position.

From the foregoing description, it will be obvious that I have perfected a very simple, practical scope mount, the carrier of which can be easily and quickly removed and/or replaced, and in a minimum length of time.

What I claim is:

1. In a telescopic mounting for guns, an elongated base having spaced-apart, vertical bores affixed to the gun, a scope carrier having depending pins accommodated in said bores releasably mounted on said base, said pins being formed with aligned recesses adjacent their lower ends, a horizontally disposed, cylindrical locking plunger slidably positioned in said base with its horizontal axis offset from the axis of the pins, said plunger being formed with flatted portions normally in engagement with the marginal walls of said recesses in said pins to lock said pins and scope carrier against vertical displacement, said plunger being formed with semi-circular recesses directly adjacent said flatted portions in which said pins are vertically slidable and said carrier removable when said plunger is actuated to align said semi-circular recesses and said pins axially.

2. The combination as defined in claim 1 in which means are provided to prevent said plunger from rotation in said base, and spring means are mounted on said plunger to oppose endwise movement from its normal locked position.

3. In a telescopic mounting for guns, an elongated base having spaced apart vertical passages affixed to the gun, a scope carrier including depending pins accommodated in said openings releasably mounted on said base, each pin being formed with a slotted recess adjacent its lower end, the lower marginal wall of each recess being disposed at an angle with relation to the upper marginal wall, a horizontally disposed, cylindrical plunger slidably mounted in said base with its horizontal axis offset from the axis of said pins, said plunger being formed, at spaced apart points, with flatted portions on three sides thereof to engage the marginal walls of said recesses and prevent vertical displacement of said pins and carrier, the lower flatted portions being shaped to conform to the lower marginal walls of the recesses and provide a wedging relationship therewith, means for holding said plunger against rotation, said plunger being formed with semi-circular recesses directly adjacent said flatted portions and of a size to allow said pins and carrier to be vertically removed from said passages when said plunger is actuated to bring said semi-circular recesses into register with said pins, and spring means mounted on said plunger to oppose endwise movement thereof and hold said carrier in locked position.

GEORGE R. KRUZELL.

References Cited in the file of this patent

UNITED STATES PATENTS

| Number | Name | Date |
| --- | --- | --- |
| 896,495 | Wentz | Aug. 18, 1908 |
| 1,648,498 | Morgan | Nov. 8, 1927 |
| 2,043,430 | Doe | June 9 1936 |
| 2,284,180 | Thomas | May 26, 1942 |
| 2,368,954 | Weaver | Feb. 6, 1945 |
| 2,371,004 | Unterman | Mar. 6, 1945 |
| 2,380,782 | Owens | July 31, 1945 |
| 2,451,266 | Whittemore | Oct. 12 1948 |
| 2,505,319 | Baker | Apr. 25, 1950 |
| 2,524,186 | Beninger | Oct. 3, 1950 |

FOREIGN PATENTS

| Number | Country | Date |
| --- | --- | --- |
| 142,545 | Germany | 1903 |
| 64,031 | Switzerland | 1912 |